United States Patent
Sun et al.

(10) Patent No.: US 9,223,779 B2
(45) Date of Patent: *Dec. 29, 2015

(54) TEXT SEGMENTATION WITH MULTIPLE GRANULARITY LEVELS

(71) Applicant: Alibaba Group Holding Limited, George Town (KY)

(72) Inventors: Jian Sun, Hangzhou (CN); Lei Hou, Hangzhou (CN); Jing Ming Tang, Hangzhou (CN); Min Chu, Hangzhou (CN); Xiao Ling Liao, Hangzhou (CN); Bing Jing Xu, Hangzhou (CN); Ren Gang Peng, Hangzhou (CN); Yang Yang, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,279

(22) Filed: Oct. 14, 2014

(65) Prior Publication Data

US 2015/0100307 A1 Apr. 9, 2015

Related U.S. Application Data

(63) Continuation of application No. 13/298,941, filed on Nov. 17, 2011, now Pat. No. 8,892,420.

(30) Foreign Application Priority Data

Nov. 22, 2010 (CN) .......................... 2010 1 0555763

(51) Int. Cl.
*G06F 17/27* (2006.01)
*G06F 17/28* (2006.01)

(52) U.S. Cl.
CPC .......... *G06F 17/2863* (2013.01); *G06F 17/271* (2013.01); *G06F 17/2785* (2013.01); *G06F 17/28* (2013.01)

(58) Field of Classification Search
CPC ............ G06F 17/2785; G06F 17/3061; G06F 17/30707; G06F 17/2755; G06F 17/30654; G06F 17/277; G06F 17/30731; G06F 17/27
USPC .......... 704/1–10, 251, 255, 257, 270; 707/739
See application file for complete search history.

(56) References Cited

U.S. PATENT DOCUMENTS

RE41,899 E 10/2010 Rose et al.
8,301,633 B2 * 10/2012 Cheslow ....................... 707/739

(Continued)

FOREIGN PATENT DOCUMENTS

| JP | H04262460 | 9/1992 |
| JP | H08129554 | 5/1996 |
| JP | H1078969 | 3/1998 |

*Primary Examiner* — Huyen Vo
(74) *Attorney, Agent, or Firm* — Van Pelt, Yi & James LLP (57) ABSTRACT

Text processing includes: segmenting received text based on a lexicon of smallest semantic units to obtain medium-grained segmentation results; merging the medium-grained segmentation results to obtain coarse-grained segmentation results, the coarse-grained segmentation results having coarser granularity than the medium-grained segmentation results; looking up in the lexicon of smallest semantic units respective search elements that correspond to segments in the medium-grained segmentation results; and forming fine-grained segmentation results based on the respective search elements, the fine-grained segmentation results having finer granularity than the medium-grained segmentation results.

15 Claims, 8 Drawing Sheets

(56) References Cited

U.S. PATENT DOCUMENTS

| | | |
|---|---|---|
| 8,321,403 B1 | 11/2012 | Wu et al. |
| 8,515,968 B1 | 8/2013 | Bayardo et al. |
| 2002/0178158 A1 | 11/2002 | Kanno |
| 2003/0216905 A1* | 11/2003 | Chelba et al. ............ 704/9 |
| 2008/0033939 A1 | 2/2008 | Khandelwal |
| 2008/0077570 A1 | 3/2008 | Tang et al. |
| 2009/0076927 A1 | 3/2009 | Sridhar et al. |
| 2011/0093331 A1 | 4/2011 | Metzler et al. |
| 2012/0130705 A1 | 5/2012 | Sun et al. |
| 2012/0191745 A1 | 7/2012 | Velipasaoglu et al. |
| 2012/0317088 A1 | 12/2012 | Pantel et al. |

* cited by examiner

TEXT SEGMENTATION WITH MULTIPLE GRANULARITY LEVELS

CROSS REFERENCE TO OTHER APPLICATIONS

This application is a continuation of co-pending U.S. patent application Ser. No. 13/298,941, entitled TEXT SEGMENTATION WITH MULTIPLE GRANULARITY LEVELS filed Nov. 17, 2011 which is incorporated herein by reference for all purposes, which claims priority to People's Republic of China Patent Application No. 201010555763.4 entitled A METHOD OF PROVIDING MULTI-GRANULARITY SEGMENTATION RESULTS AND A DEVICE FOR SAME filed Nov. 22, 2010 which is incorporated herein by reference for all purposes.

FIELD OF THE INVENTION

The present application relates the field of word information processing technology. In particular, it relates to establishing word segmentation lexicons.

BACKGROUND OF THE INVENTION

Languages can be divided into two types according to whether or not they have word dividers. One type has word dividers, such as English, German, and many other European languages. Generally, spaces between the words serve as word dividers. The other type has no word dividers for marking the words in a sentence. Many East Asian languages such as Chinese, Japanese, and Korean are non-divider-marked languages.

Search engine, machine translation, and phonetic synthesis applications involve language text processing problems that often require segmenting the text of a given non-divider-marked language and forming a segment series comprising segments from a sentence. The segmentation process often involves a word segmentation lexicon, which includes a database/dictionary comprising a considerable number of pre-stored entries. During word segmentation, a given text is matched against the entries of the word segmentation lexicon according to a particular strategy (e.g., a forward maximum matching method from left to right, a backward maximum matching method from right to left, a minimum segmentation method, etc.). For example, in a maximum matching method, if the longest entry that can match the input text is found in the lexicon, then it is identified as a word, and the identified word is regarded as a segment. Proceeding in this manner, one can segment the given text into a segment series composed of segments. The segments may include successfully matched words as well as characters or dynamically identified words.

For a given piece of text, the longer the segments in a resulting word segment series (i.e., the smaller the number of segments contained in the segment series), the greater the word segmentation granularity. Conversely, the larger the number of segments in a resulting word segment series, the smaller the word segmentation granularity. For example, for the given text "中华人民共和国成立了" ["The People's Republic of China was established"], the fine-grained word segmentation result is "中华-人民-共和 国-成立-了" ["China-People's-Republic-establish-ed"], and the coarse-grained word segmentation result is "中华人民共和国-成 立-了" ["People's Republic of China-establish-ed"].

Different applications have different requirements concerning the granularity levels of segmentation results. For example, in machine translation, granularity should be somewhat larger, e.g., "企业管理" ["business management"] should be a single segment. But in the index system of a search engine, "企业管理" would generally be divided into two segments ("企业" ["business"] and "管理" ["management"]).

Granularity level requirements concerning segmentation results can vary even for the same type of application. The example of search engine applications is used below for the purpose of explanation. In search engine applications, search engines require different word segmentation granularities for different fields. For example, for search engines used in the field of e-commerce (e.g., for making product searches), both sellers and buyers demand higher recall rates in their searches. To accomplish this, the search system needs to have smaller index granularity and accordingly requires finer-grained segmentation results. For search engines used for general web page searches, search precision becomes particularly important to users because of the vast quantity of Internet web pages. To accomplish this, the search system requires coarser-grained segmentation results. Search recall rate and search precision are thus important measures for evaluating search quality. The search recall rate, which measures how well the system finds relevant information, is the ratio of relevant documents found to the total number of relevant documents. Search precision, which measures how well the system performs in finding relevant information, is the ratio of relevant documents found to all documents found. Word segmentation granularity relates to search recall rate and search precision. Generally speaking, the smaller the word segmentation granularity, the higher the search recall rate; the larger the word segmentation granularity, and the higher the search precision.

Granularity level requirements concerning segmentation results even vary according to different use stages within the same field of the same type of application. Again, we use web search engine applications as an example for purposes of illustration. In order to meet user requirements with respect to both search recall rate and search precision, granularity level requirements will differ between the index stage and the sequencing stage of search. In the index stage, finer-grained segmentation results are required so that a sufficient number of web pages may be located. In the sequencing stage, coarser-grained segmentation results are required so as to meet the need for search precision and to avoid providing the user with irrelevant web pages.

Figure 1A:
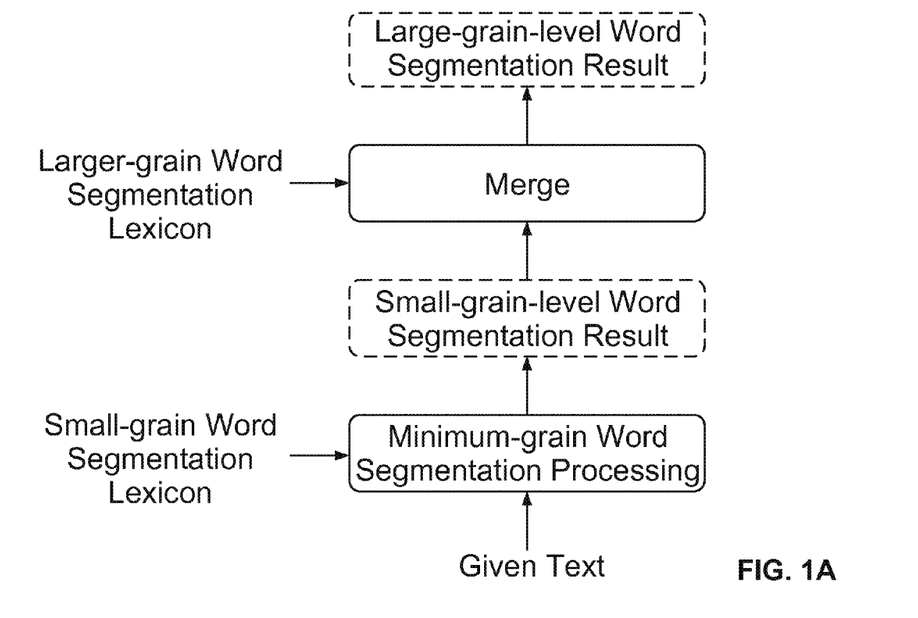
FIG. 1A illustrates a typical scheme for providing segmentation results with multiple levels of granularity.

To solve the problems described above, the prior art mainly employs two schemes for providing segmentation results having multiple levels of granularity:

FIG. 1A illustrates a typical scheme for providing segmentation results with multiple levels of granularity. First, minimal-grained word segmentation is performed. Then, a bottom-to-top dynamic merge is conducted. Specifically, a finer-grained word segmentation lexicon A is used to perform word segmentation on a given text. Different segment series can be generated in the word segmentation process. For example, the text $S_1S_2S_3S_4S_5S_6S_7$ (where $S_n$ represents a character) can be divided into $S_1S_2\_S_3S_4\_S_5\_S_6S_7$ or $S_1S_2S_3\_S_4S_5\_S_6S_7$. Then one of the segmentation series—let us assume here that it is $S_1S_2\_S_3S_4\_S_5\_S_6S_7$—can be selected as the optimal segment series according to a preset selection algorithm. The preset algorithm can be an algorithm based on a statistical model.

In order to provide coarser-grained segmentation results, a merge is performed on the series $S_1S_2\_S_3S_4\_S_5\_S_6S_7$. The specific merge process requires assessing whether a combination of two segments in the series $S_1S_2\_S_3S_4\_S_5\_S_6S_7$ matches entries in word segmentation lexicon B, which contains longer entries. If these two segments are merged, a merged, coarser-grained segment series will result. Let us assume here that $S_1S_2$ and $S_3S_4$ can be merged and that $S_5$ and $S_6S_7$ can be merged, in which case the merged, coarser-grain segment series will be $S_1S_2S_3S_4$-$S_5S_6S_7$.

If this method is used, some semantic items will be lost during word segmentation. For example, the semantic elements $S_1S_2S_3$ and $S_4S_5$ will be lost. We will use an actual example here for the purpose of illustration. The text is "本不锈钢管用一级钢铸造" ["This stainless steel tube is cast using grade 1 steel"], wherein "不锈钢管" ["stainless steel tube"] in fact contains two semantic items: "不锈钢" ["stainless steel"] and "钢管" ["steel tube"]. If we segment "不锈钢管" ["stainless steel tube"] at the minimum granularity into "不锈–钢–管" ["stainless steel-tube"] (where "-" separates two adjacent segments) and then merge them again to form "不锈钢管" ["stainless steel tube"], then we lose the semantic item "钢管" ["steel tube"]. Consequently, the term "钢管" ["steel tube"] will not be found during the search for this text. If we segment "不锈钢管" ["stainless steel tube"] at the minimum granularity into "不–锈–钢管" ["none-stain-steel tube"] and then merge them again to form "不锈钢管" ["stainless steel tube"], then we lose the semantic item "不锈钢" ["stainless steel"]. "不锈钢" ["stainless steel"] is therefore not found during the search for this text.

In addition, it is difficult to ensure merging precision. Assuming that the segment series obtained from minimum-granularity word segmentation of the given text is "本-不锈钢-管-用-一级-钢-铸造" ["this-stainless steel-tube-using-grade 1-steel-cast"], ambiguities will be encountered during the merger. The merged result may be "不锈钢管" ["stainless steel tube"] or "管用" ["useful"]. If the segment series obtained from minimum-granularity word segmentation of the given text is "本-不锈钢-管用--一级-钢-铸造" ["this-stainless steel-useful-grade 1-steel-cast"], then it cannot be merged again to obtain the semantic item "不锈钢管" ["stainless steel tube"].

Figure 1B:
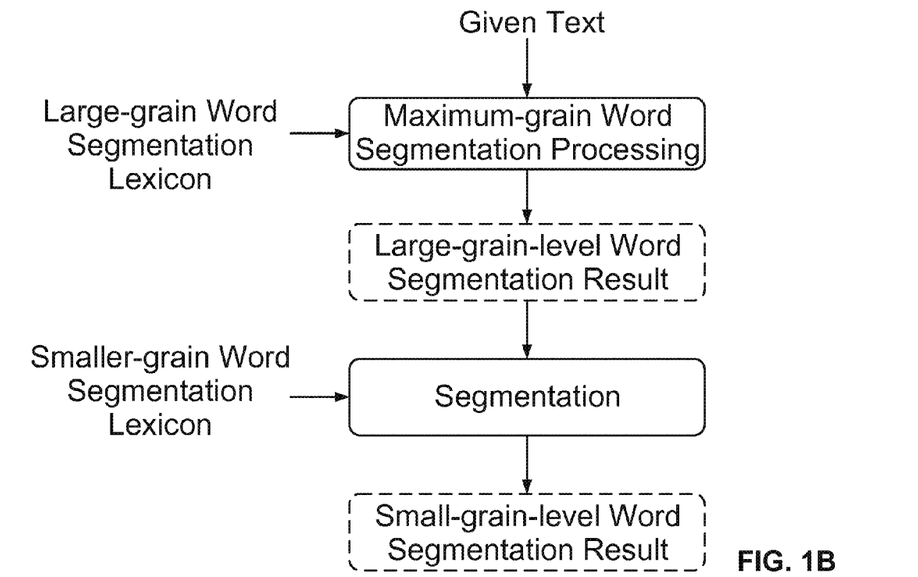
FIG. 1B illustrates another typical scheme for providing segmentation results with multiple levels of granularity.

FIG. 1B illustrates another typical scheme for providing segmentation results with multiple levels of granularity. First, maximum-grain word segmentation is performed. Then, segmentation from top to bottom is performed. In particular, a coarser-grained word segmentation lexicon C is used, and a model and algorithm are used to perform dynamic word segmentation of a given text $S_1S_2S_3S_4S_5S_6S_7$ (select the optimal segment series) to obtain the segment series $S_1S_2S_3S_4$-$S_5S_6S_7$.

To obtain a finer-grained word segmentation result, each semantic element in $S_1S_2S_3S_4$-$S_5S_6S_7$ is segmented again. The specific segmentation process is to assess each segment in the series $S_1S_2S_3S_4$-$S_5S_6S_7$ to determine whether it contains two or more other finer-grained entries in word segmentation lexicon C. If it does, then this segment is sub-divided into two or more other entries. Let us assume that $S_1S_2S_3S_4$ can be sub-divided into $S_1S_2$ and $S_3S_4$ and that $S_5S_6S_7$ can be sub-divided into $S_5$ and $S_6S_7$, in which case the finer-grained word segmentation result obtained after cutting would be $S_1S_2$-$S_3S_4$-$S_5$-$S_6S_7$.

If this method is used, a greater number of coarse-grained entries will need to be recorded in the lexicon in order to solve the problem of ambiguities occurring during maximum-grain word segmentation. For example, given the text of "企业管理科学技术" ["business management science and technology"], if the coarser-grained entries "企业管理" ["business management"] and "管理科学" ["management science"] are recorded in the lexicon, then "企业 管理科学" ["business management science"] may be segmented into "企业管理-科学" ["business management-science"] or "企业-管理科学" ["business-management science"]. The solution to this ambiguity is also to record an even longer entry, "企业管理科学" ["business management science"] in the lexicon. However, "企业管理科学" ["business management science"] will also give rise to a segmentation ambiguity with respect to "科学技术" ["science and technology"]. Thus, such a set composed of coarse-grained entries is not a closed set. Expansion of the lexicon will create difficulties for lexicon maintenance.

As can be seen, the greater the granularity of the entries in a word segmentation lexicon, the greater the number of different segment series that will be generated during word segmentation. That is, there will be more word segmentation paths and thus more ambiguity problems. It will be difficult to ensure the precision rate of maximum-grain segmentation.

When there are maximal-grained segmentation results, the fine-grained words of these segments can be obtained by checking the lexicon. However, as a lexicon expands, manual maintenance of these entries and the fine-grained words of these entries, while maintaining the quality of entries, can be costly.

In summary, the prior art for providing segmentation results with multiple granularity levels typically experiences the problem of low recall rates, which results in lost semantic items, or the problem of overly-vast word segmentation lexicons and low word segmentation processing precision.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Segmentation of text into segments with multiple granularity levels is disclosed. In some embodiments, a word segmentation lexicon (e.g., a lexicon of smallest semantic units) is established. The entries in the lexicon of smallest semantic units have reasonable lengths and also have semantic integrity. In addition, search elements corresponding to the entries are stored in the lexicon. When a given entry undergoes word segmentation, the given entry undergoes word segmentation based on the established lexicon of smallest semantic units to obtain medium-grained segmentation results. The medium-grained segmentation results are merged using a word segmentation lexicon containing coarser-grained entries, thereby obtaining coarser-grained segmentation results. Using search elements corresponding to entries stored in the lexicon of smallest semantic units, finer-grained segmentation results are obtained based on medium-grained segmentation results. In some embodiments, the text is in a nondivider marked language such as Chinese.

Figure 2:
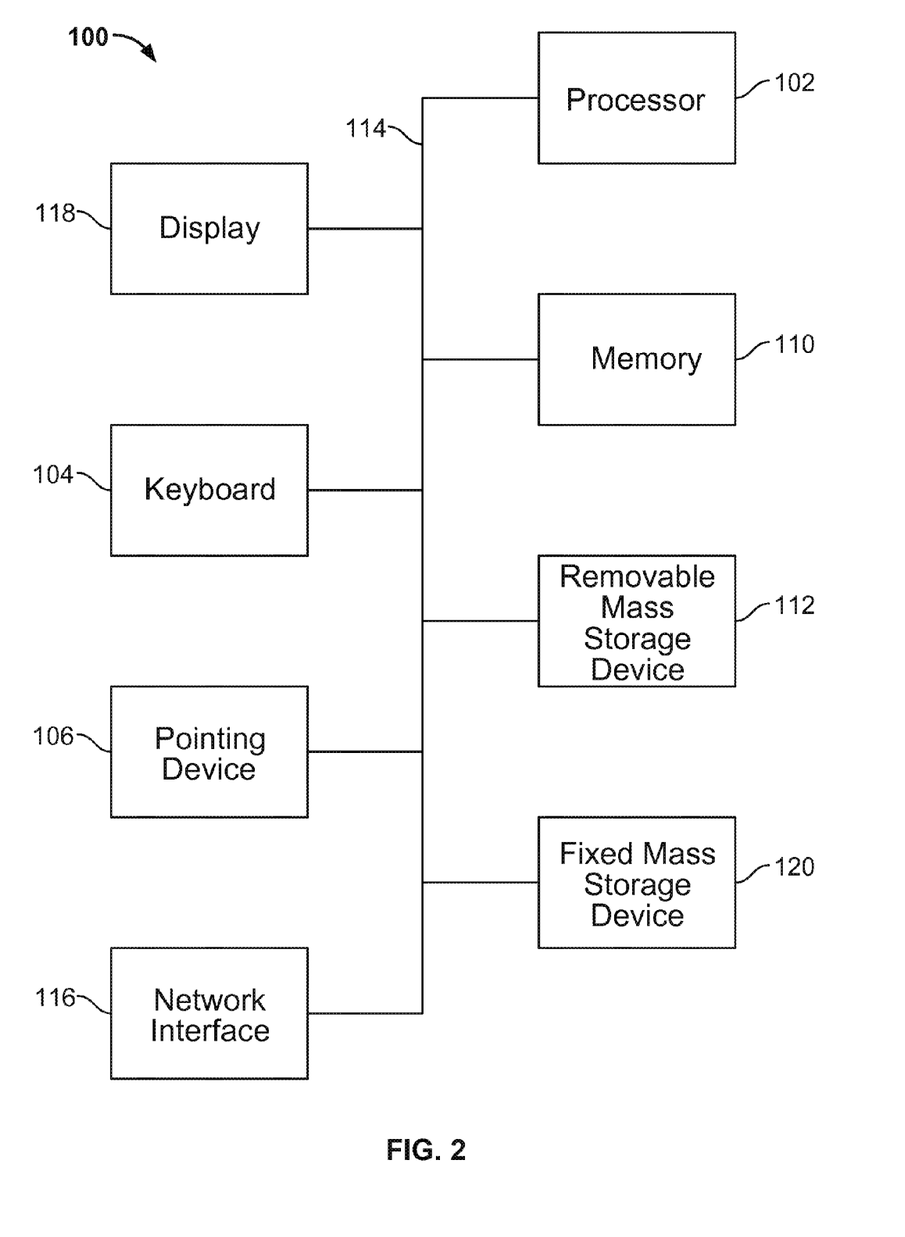
FIG. 2 illustrates an embodiment of a system for segmenting text and providing segmentation results with multiple granularity levels.

FIG. 2 illustrates an embodiment of a system for segmenting text and providing segmentation results with multiple granularity levels. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used for segmenting text and providing segmentation results with multiple granularity levels.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112 and 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system I/O. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 3:
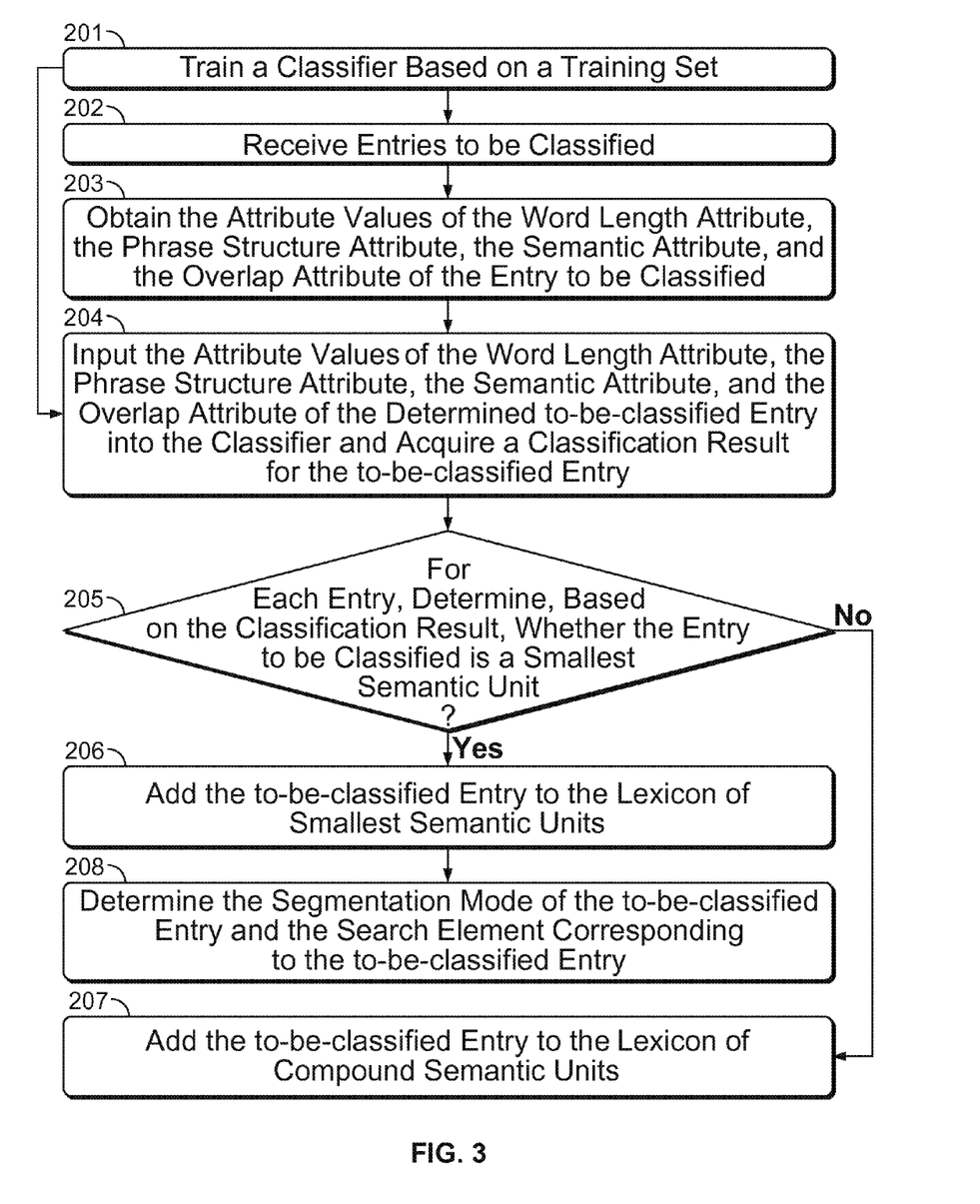
FIG. 3 is a flowchart illustrating an embodiment of a process for establishing a word segmentation lexicon, in particular a lexicon of smallest semantic units.

FIG. 3 is a flowchart illustrating an embodiment of a process for establishing a word segmentation lexicon, in particular a lexicon of smallest semantic units. Process 200 may be performed on a system such as 100.

At 201, a classifier that is trained based on a training set is obtained. In some embodiments, the training set includes a number of sample entries, and each training sample entry in the training set includes a word length attribute, an independent use rate, a phrase structure rule attribute, a semantic attribute, an overlap attribute, and a classification result.

The attribute value of the word length attribute includes a character count for the text in the training sample entry.

The value of the phrase structure attribute includes an independent use rate value of fine-grained words of the training sample entry and an indicator indicating whether the training sample entry complies with phrase structure rules.

The independent use rate value of a phrase may be measured in terms of its frequency of appearance or number of appearances in a set of independent phrases (e.g., independent phrases obtained from log entries, anchor text, etc.).

In some embodiments, the system provides predetermined sets of enumerated entries of various categories (e.g., sets of enumerated entries of TV shows, book titles, product brands, etc.). The value of the semantic attribute depends on whether the sample entry is included in the set of enumerated entries. Stated another way, the semantic attribute value indicates an inclusion state of the training sample entry in the set of enumerated entries. When the training sample entry is included in a predetermined set of enumerated entries, the value of the semantic attribute is the identifier for that corresponding predetermined set of enumerated entries. If the training sample entry is not found in any of the predetermined sets of enumerated entries, the value of the semantic attribute is assigned as an identifier different from the identifier of any predetermined set of enumerated entries.

The value of the overlap attribute includes the probability of a training sample entry overlapping with another entry in any of the enumerated entries of various categories, and an indicator indicating whether the overlap portion is a fine-grained word.

A classification result includes an indicator indicating whether the pre-rated training sample entry is a compound semantic unit or a smallest semantic unit. As used herein, a compound semantic unit refers to a portion of text that can be further segmented into semantically meaningful (e.g., understandable by a human) parts, and a smallest semantic unit refers to text that cannot be further segmented into meaningful parts.

For example, the training sample entry "企业管理" ["business management"] has four characters. Therefore, the word length value (i.e., character count) of this training sample entry is 4. The training sample entry "企业管理" ["business management"] contains the fine-grained words "企业" ["business"] and "管理" ["management"]. The rate at which these two fine-grained words appear in a set of independent use entries is determined and the highest rate is selected to serve as the fine-grained word independent use rate for the value of the phrase structure attribute of the training sample entry "企业管理" ["business management"]. As used herein, the independent use entry set may be obtained by an Internet query log, anchor text, or any other appropriate techniques. For example, during a collection phase to build up the independent use entry set, if a user inputs the search key word "企业" ["business"] in an Internet search engine, then "企业" ["business"] will be recorded into the query log, indicating that "企业" ["business"] can be used independently. In addition, each word input by users that is separated by a partition marker such as a comma or a space can be regarded as an independently used word. Assume that the fine-grained word "管理" ["management"] occurs most frequently in the independent use entry set, with 1,000,000 instances. On the other hand, if the entry lacks an independent, fine-grained word (e.g., no one has ever entered the word independently of other words into the search engine), then the rate is 0.

Phrase structure rules are a way to describe a given language's syntax. The rules are typically obtained through extensive research on a natural language. In the case of Chinese, phrases are generally composed of "adjective+noun," "noun+noun," or "verb+noun." Phrase structure rules can be stored in the form of regular expressions. The training sample entry "企业 管理" ["business management"] is composed of two fine-grained nouns: "企业" ["business"] and "管理" ["management"]. Thus, the training sample entry "企业管理" ["business management"] complies with the phrase structure rule. Assuming that the indicator for compliance with the phrase structure rule is set at 1, the indicator for non-compliance with the phrase structure rule is 0. Therefore, the value of the phrase structure attribute for the training sample entry "信息系统工程" ["information system engineering"] is (1,000,000, 1).

In some embodiments, the system provides predetermined sets of enumerated entries of various categories (e.g., sets of enumerated entries of movie titles, book titles, product brands, etc.). The value of the semantic attribute depends on whether the sample entry is included in the set of enumerated entries. For example, the identifier for a set of TV/movie titles is S21. The entries included in the category of movie titles S21={Godfather, Shrek, First Party Second Party . . . }. The identifier for the set of novel titles is S22. The entries included in the set of novel titles are S22={The Hobbit, A Tale of Two Cities, Dream of the Red Chamber, . . . }. The identifier for a set of textbook subjects is S23. The entries included in the set of textbook subjects are S23={information engineering, psychology, philosophy, business management, industrial and commercial management, . . . }. The identifier for the set of city names is S24, and the entries include S24={Beijing, Shanghai, New York, Hohhot, . . . }. The training sample entry "企业管理" ["business management"] is included in the set of textbook subjects. Therefore, the identifier corresponding to the training sample entry "企业管理" ["business management"] is S23. If the training sample entry is not included in any type of enumerated entry set, then the value of the phrase structure value of this training sample entry is an identifier that is differentiated from the identifiers for any type of enumerated entry set, e.g., S20, which does not correspond to any enumerated entry set.

To determine the value for the overlap attribute, the probability that the training sample word will overlap in the training text with another entry included in the lexicon is calculated. As used herein, an overlap refers to a situation where some characters in the training sample entry form another entry in the lexicon when combined with some characters that precede or follow in the training text that contains the training sample entry. For example, let us assume that the training sample entry is "企业管理" ["business management"] and the training text includes " . . . 众所周知, 企业管理科学是一门新兴的学科 . . . "[" . . . as we all know, business management science is a new subject . . . "], wherein "企业管理" ["business management"] and "管理科学" ["management science"] have overlapping text "管理" ["management"]. When two words overlap, the overlap portion may be a semantically meaningful fine-grained word, such as "管理" ["management"] in this example. In some cases, the overlap might also be a single character. For example, "甲方乙方" ["First Party Second Party" (a Chinese movie)] and "方才" ["just now"] overlap in the context-expanded training text " . . . 甲方乙方才上映 . . . "[" . . . First Party Second Party just appeared in theaters . . . "]. The fine-grained words for "甲方乙方" ["First Party Second Party"] are "甲方/乙方" ["First Party/Second Party"], and the overlap portion is the character "方"["Party" or "just," depending on context], which is not a semantically meaningful fine-grained word of "甲方乙方" ["First Party Second Party"]. Accordingly, the probability of the training sample entry overlapping with another entry in the lexicon when the training sample entry appears in a training text is calculated. When the overlap portion is a fine-grained word, the corresponding indicator may be set to 1; otherwise, the indicator may be set to 0. Let us assume that, in this embodiment, the probability of the training sample entry "企业管理" ["business management"] that overlaps with other entries is 2% and that the portion that overlaps with the word "管理" ["management"] is a fine-grained word. In this case, the overlap value for the training sample entry "企业管理" ["business management"] is (2%, 1).

In this example, the training sample entry "企业管理" ["business management"] is classified to be a compound semantic element. Therefore, the value and classification results of the training sample entry "企业管理" ["business management"], "Hohhot", etc., are shown in Table 1.

TABLE 1

Examples of training sample entry values and rating results in the training set

| Training sample entry | Word length attribute value | Phrase structure attribute value | Semantic attribute value | Overlap attribute value | Classification results |
|---|---|---|---|---|---|
| "企业管理" ["business management"] | 4 | (1,000,000, 1) | S23 | (2%, 1) | Compound semantic unit |
| "呼和浩特" ["Hohhot"] | 4 | (−1, 0) | S24 | (0.001%, 0) | Smallest semantic unit |
| . . . | . . . | . . . | . . . | . . . | . . . |

On the basis of the attribute values and rated classification results of all the training sample entries in the training set shown in Table 1, one may use a machine learning technique, such as a GBDT (Gradient Boosted Decision Tree), maximum entropy, Support Vector Machine (SVM), or any other appropriate techniques to train a classifier. The classifier in the present embodiment is established based at least in part on the word length attribute values, the phrase structure attribute values, the semantic attribute values, and the overlap attribute values of the entries in the training set. The classifier is used to determine if an entry to be classified is a compound semantic unit or a smallest semantic unit. Generally, entries with larger word length attribute values, with phrase structure attributes in which the value of the first element is relatively high, and that comply with entries that conform to conventional phrase structure rules have a higher probability of being determined by the classifier to be compound semantic units. Entries with small word length attribute values, with phrase structure attributes in which the value of the first element is relatively low, and that do not comply with entries that conform to conventional phrase structure rules have a higher probability of being determined by the classifier to be smallest semantic units.

The machine learning techniques used to train the classifier is well known to those skilled in the art. For example, the decision tree learning technique builds a model for predicting the value of a target variable (e.g., the classification result) based on the input variables (e.g., the character count, the independent use rate, the phase structure rule value, the semantic attribute value, and the overlap attribute value) by splitting the source set into subsets based on an attribute value test and repeating the process on each derived subset in a recursive manner. The support vector machine technique marks the training set entries as belonging to one of N classes and builds a model that predicts, for each given input, which of the possible classes comprises the input.

At 202, entries to be classified are received. The entries may be received from a variety of sources such as existing word segmentation lexicons, a database, the Internet, etc.

In this example, the entries to be classified are "五大连池" ["Five Linked Lakes," a tourist attraction in China], "菊花茶" ["chrysanthemum tea"], and "不锈钢管" ["stainless steel tube"].

At 203, the attribute values of the word length attribute, the phrase structure attribute, the semantic attribute, and the overlap attribute of the entries to be classified are obtained.

The process of determining the attribute values of the word length attribute, the phrase structure attribute, the semantic attribute, and the overlap attribute of entries to be classified is similar to the approach employed in step 201 for determining the attribute values of the above-described four attributes of the training sample entries in the training set. The attribute value information of the example entries to be classified is shown in Table 2.

TABLE 2

Examples of attribute values of entries to be classified

| Entry to be classified | Word length attribute value | Phrase structure attribute value | Semantic attribute value | Overlap attribute value |
|---|---|---|---|---|
| "五大连池" ["Five Linked Lakes"] | 4 | (9, 0) | 0 | (0.01%, 1) |
| "菊花茶" ["chrysanthemum tea"] | 3 | (21, 1) | 0 | (2%, 1) |
| "不锈钢管" ["stainless steel tube"] | 4 | (11, 1) | 0 | (1%, 1) |

TABLE 2-continued

Examples of attribute values of entries to be classified

| Entry to be classified | Word length attribute value | Phrase structure attribute value | Semantic attribute value | Overlap attribute value |
|---|---|---|---|---|
| "笔记本电脑包" ["notebook computer bag"] | 6 | (35, 1) | 0 | (4%, 1) |
| "迷你轿车" ["mini-sedan"] | 4 | (66, 1) | 0 | (5%, 1) |

At 204, the attribute values of the word length attribute, the phrase structure attribute, the semantic attribute, and the overlap attribute of the entries to be classified are input into the classifier to obtain classification results of entries to be classified.

The classification results for "五大连池" ["Five Linked Lakes"], "菊花茶" ["chrysanthemum tea"], and "不锈钢管" ["stainless steel tube"] in this example correspond to the smallest semantic units. The classification results for "笔记本电脑包" ["notebook computer bag"] and "迷你轿车" ["mini-sedan"] correspond to compound semantic units. The granularity of a compound semantic unit is greater than that of a smallest semantic unit.

At 205, it is determined, based on the classification result for each entry to be classified, whether the entry is the smallest semantic unit. If the entry is not a smallest semantic unit, the process proceeds to 207, where the entry to be classified is added to the lexicon of compound semantic units. If, however, it is a smallest semantic unit, the process proceeds to 206, where the entry to be classified is added to the lexicon of smallest semantic units.

In this example, "五大连池" ["Five Linked Lakes"] "菊花茶" ["chrysanthemum tea"], and "不锈钢管" ["stainless steel tube"] are added to the lexicon of smallest semantic units. "笔记本电脑包" ["notebook computer bag"] and "迷你轿车" ["mini-sedan"] are added to the lexicon of compound semantic units.

The lexicon of smallest semantic units and the lexicon of compound semantic units are used in some embodiments to transform a segment series of fine-grained words (e.g., a series comprising the smallest semantic units) into a segment series of coarser-grained words. For example, a text is initially segmented into a series of segments comprising the smallest semantic units according to the lexicon of smallest semantic units (in other words, the segments in the series are found in the lexicon of smallest semantic units). Based on the lexicon of compound semantic units, the segments in the initial series are merged to form coarser-grained segments that are found in the lexicon of compound semantic units.

At 208, the segmentation modes of the entries to be classified and the search element corresponding to the entries are determined and stored. The segmentation mode comprises two types: segmentable and unsegmentable. Whether an entry is segmentable or unsegmentable is determined based on two criteria: (1) Is it a proper noun? This can be determined by looking the entry up in a proper noun database. If it is a proper noun, then it cannot be segmented further and is unsegmentable. An example is "五大连池" ["Five Linked Lakes"]. (2) Can it be further segmented semantically? If the entry is a fixed expression (e.g., an expression that as a whole has a specific meaning), as in "黄金周" ["Golden Week"] or "大哥大" ["da-ge-da," Chinese slang for "cell phone"], then it is unsegmentable. Whether an entry is segmentable can be determined by looking up the entry in a predetermined database of proper nouns and fixed expressions. An entry that is neither a proper noun nor a fixed expression is segmentable. For example, "润肤乳" ["moisturizing lotion"] and "菊花茶" ["chrysanthemum tea"] are neither proper nouns nor fixed expressions and are segmentable.

When the segmentation mode of the entry to be classified is segmentable, the search elements corresponding to the entry to be classified are fine-grained words included within the entry to be classified. When the segmentation mode of the entry to be classified is unsegmentable, the search element corresponding to the entry to be classified is the entry to be classified itself.

An example data structure of entries in the lexicon of smallest semantic units is as shown in Table 3.

TABLE 3

Examples of data structures of entries in lexicon of smallest semantic units

| Entry | Segmentation mode | Search element |
|---|---|---|
| 五大连池 [Five Linked Lakes] | Unsegmentable | 五大连池 [Five Linked Lakes] |
| 菊花茶 [chrysanthemum tea] | Segmentable | 菊花 [chrysanthemum], 花茶 [flower tea], 茶 [tea] |
| 不锈钢管 [stainless steel tube] | Segmentable | 不锈钢 [stainless steel], 钢管 [steel tube] |
| 大哥大 [dageda] | Unsegmentable | 大哥大 [dageda] |
| 黄金周 [Golden week] | Unsegmentable | 黄金周 [Golden week] |
| 润肤乳 [moisturizing lotion] | Segmentable | 润肤 [moisturizing], 乳 [lotion] |
| ... | ... | ... |

Process 200 can also be understood as taking the entries in an existing word segmentation lexicon (or entries obtained by other means) and classifying them either for the lexicon of smallest semantic units or for the lexicon of compound semantic units.

The lexicon of smallest semantic units determined by the scheme described above generally includes shorter entries and fewer entries than existing coarse-grained word segmentation lexicons, thereby reducing the time required for word segmentation lexicon-based segmentation and the probability of word segmentation ambiguities. Therefore, it increases the precision of word segmentation processing and reduces the difficulties of lexicon maintenance.

Figure 4:
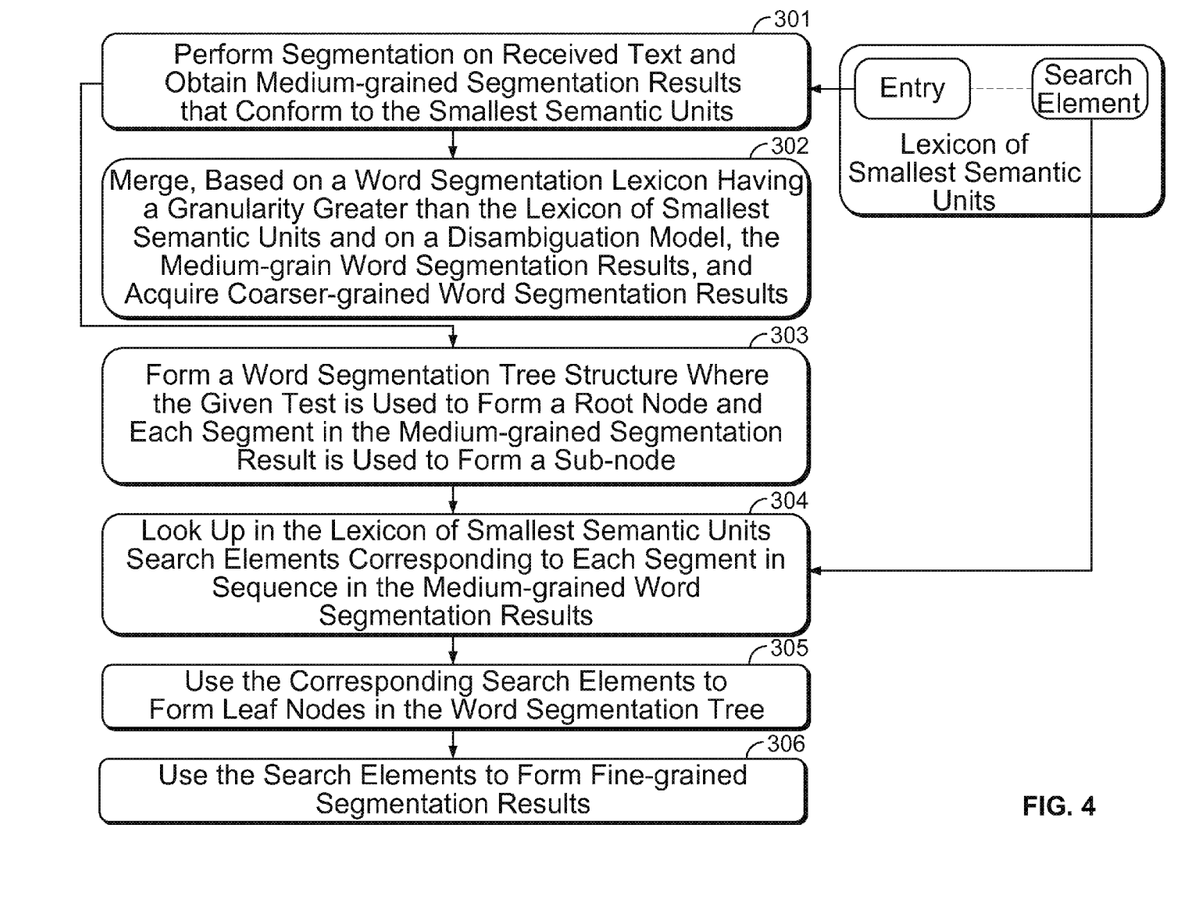
FIG. 4 is a flowchart illustrating an embodiment of a process of obtaining segmentation results of multiple granularities, based on the lexicon of smallest semantic units and the lexicon of compound semantic units.

FIG. 4 is a flowchart illustrating an embodiment of a process of obtaining segmentation results of multiple granularities, based on the lexicon of smallest semantic units and the lexicon of compound semantic units.

At 301, segmentation is performed on a piece of text that is received. The segmentation is based on the lexicon of the smallest semantic units for a given text. The segment series obtained through word segmentation is regarded as an intermediate set of segmentation results (also referred to as the medium-grained segmentation results). The segments in the segmented series include smallest semantic units. The process then proceeds to 302 and 303 in parallel.

In some embodiments, the given text is matched with entries in the lexicon of smallest semantic units, and an existing disambiguation model is used to resolve any segmentation ambiguity problems that may arise. For example, a given text is "本不锈钢管用一 级钢铸造" ["this stainless steel tube is cast using grade 1 steel"], and lexical queries are conducted from left to right based on the lexicon of smallest semantic units. If we assume that the maximum number of characters in a segment is 6, then the first 6 characters starting from the leftmost character of the given text "本不锈钢管用" ["this stainless steel tube uses"] is assessed to determine whether it can be found in the lexicon of smallest semantic units. In another words, a processing window of 6 characters is used to extract the character string to be processed. If the characters can be found in the lexicon of smallest semantic units, then the segment composed of these 6 characters is recorded in the first word segmentation series. If it cannot be found, then the rightmost character is eliminated, and the segment comprising the remaining 5 characters "本 不锈钢管" ["this stainless steel tube"] is again compared. The process is repeated for the remaining characters until either all the characters have been processed or a smallest semantic unit is found. In this example, no matching smallest semantic unit is found for the characters "本 不锈钢管用" ["this stainless steel tube uses"].

After all 6 characters have been processed, the window shifts over by 1 character and the process is repeated on the next 6 characters "不锈钢管用一" ["stainless steel tube uses first"]. An assessment is made to determine whether the characters can be found in the lexicon of smallest semantic units. If it can be found, then the segment of these 6 characters is recorded in the first word segmentation series. If it cannot be found, then the rightmost character is eliminated, and the remaining 5 characters "不锈钢管用" ["stainless steel tube uses"] is again compared, and the process is repeated for the remaining characters. In this iteration, the smallest semantic unit "不锈钢" ["stainless steel"] is identified.

By repeatedly shifting the window and repeating the process, all the smallest semantic units contained in the given text are obtained. The smallest semantic units that are identified may constitute multiple segment series (multiple word segmentation paths) and result in ambiguities. In some embodiments, when word segmentation ambiguity occurs, one segment series from among the multiple series is selected on the basis of a disambiguation model, such as a conditional random field (CRF) model, a hidden Markov model (HMM), a maximum entropy (ME) model, etc. As is known to those skilled in the art, these disambiguation models are based on corpus analysis using statistical information learning, where word segmentation is performed according to various contextual features. The process continues in this manner until the segment series "本-不锈钢管-用- 一级-钢-铸造" ["this-stainless steel tube-using-grade 1-steel-cast"] is obtained.

The segment series obtained from the minimum-grain word segmentation is "本- 不锈钢-管-用- 一级-钢-铸造" ["this-stainless steel-tube-using-grade 1-steel-cast"]. An existing bottom-to-top dynamic merge scheme may produce "本不锈钢-管用 ---级-钢-铸造" ["this-stainless steel-useful-grade 1-steel-cast"], which does not include the semantic item "钢管" ["steel tube"]. Hence, there is segmentation ambiguity, which will result in lower precision during subsequent searches. Furthermore, documents relating to "钢管" ["steel tube"] will not be found due to the missing term, and the search recall rate will decrease as well. In contrast, the present application performs word segmentation based on smallest semantic units rather than minimum word granularity, thereby lowering the probability of segmentation ambiguities and thus solving the problems described above more effectively.

As another example, a given text is "企业管理科学技术" ["business management science and technology"]. The segment series that is obtained from word segmentation in accordance with the lexicon of smallest semantic units is "企业-管理-科学-技术" ["business-management-science-technology"]. If an existing bottom-to-top dynamic merge scheme (e.g., an existing maximal-grained word segmentation scheme) is followed, there will be segmentation ambiguity problems between "企业管理" ["business management"] and "管理科学" ["management science"], between "管理科学" ["management science"] and "科学技术" ["science and technology"], and between "管理" ["management"] and "理科" ["the sciences"] during maximal-grained word segmentation. Word segmentation based on maximum granularity requires a huge quantity of entries and, consequently, a large volume of unnecessary segmentation ambiguities, resulting in low segmentation precision. Entries among smallest semantic units have a smaller probability of having combination modifiers. Therefore, word segmentation based on smallest semantic units can raise segmentation precision.

At 302, based on a word segmentation lexicon (e.g., the lexicon of compound semantic units obtained using process 200) that has a granularity greater than the granularity of a smallest semantic unit and using a disambiguation model, segments in the medium-grained segmentation results are merged to obtain segmentation results of first granularity. The segmentation results of first granularity are also referred to as coarse-grained segmentation results since they are coarser-grained (i.e., have greater granularity) than the medium-grained segmentation results.

Taking the medium-grained segmentation results of "企业-管理-科学 -技术" ["business-management-science-technology"] as an illustrative example, let us assume that a word segmentation lexicon that has a greater granularity includes the entries "企业管理" ["management science"] and "科学技术" ["science and technology"]. Segments in the series "企 业-管理-科学- 技术" ["business-management-science-technology"] can therefore be merged into coarser-grained segments, forming post-merger coarser-grained segmentation results of "企 业管理-科学技术" ["business management-science and technology"].

Figure 5:
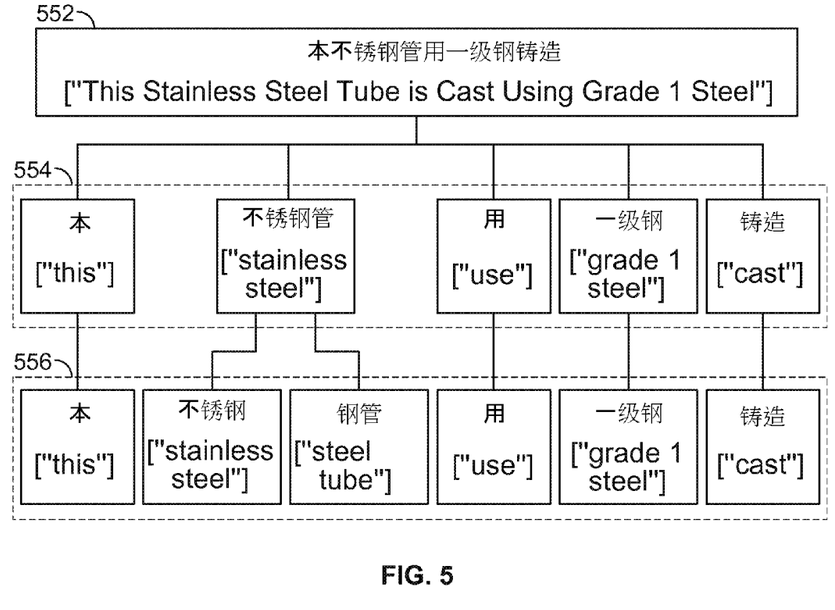
FIG. 5 is a diagram illustrating an example word segmentation tree structure.

At 303, a word segmentation tree structure is optionally formed, where the given text is used to form a root node and each segment in the medium-grained segmentation results obtained in step 301 is used to form a sub-node of the root node. In a left-to-right sequence, each node corresponding to a segment is added to the root node. FIG. 5 is a diagram illustrating an example word segmentation tree structure. In this example, node 552 corresponds to the root node (the given text) and nodes 554 correspond to the sub-nodes (the medium-grained segmentation results).

Returning to FIG. 4, at 304, respective search elements corresponding to the segments in the medium-grained segmentation results are looked up in the lexicon of smallest semantic units. As discussed above in connection with process 200, the segments and their corresponding search elements are stored in the lexicon of smallest semantic units. Referring to Table 3 for an example: for the given text "本不锈钢管用一级 钢铸造" ["This stainless steel tube is cast using grade 1 steel"], the medium-grained segmentation results are "本-不锈钢管- 用-一级-钢-铸造" ["this-stainless steel tube-using-grade 1-steel-cast"]. For example, the search elements corresponding to the segment "不锈钢管" ["stainless steel tube"] are "不锈钢" ["stainless steel"] and " 钢管" ["steel tube"].

At 305, optionally, the search elements corresponding to the entries are used to form leaf nodes in the word segmentation results tree. As shown in the example tree in FIG. 5, the leaf nodes are nodes 556.

At 306, segmentation results of second granularity are obtained based on the search elements. The segmentation results of second granularity are also referred to as fine-grained segmentation results since they are finer-grained than the medium-grained segmentation results. In some embodiments, the leaf nodes in the word segmentation result tree are regarded as the second granularity segmentation results.

Referring to the example tree of FIG. 5, the finer-grained segmentation results obtained for the given text "本不锈钢钢管用一级钢铸造" ["This stainless steel tube is cast using grade 1 steel"] are "本-不锈钢-钢管 -用-一级-钢-铸造" ["this-stainless steel-steel tube-using-grade 1-steel-cast"].

Process 300 uses the lexicon of smallest semantic units established in process 200 and performs word segmentation on a given text to obtain medium-grained segmentation results. Then, a merge is performed on the medium-grained segmentation results in accordance with a lexicon having granularity greater than the lexicon of smallest semantic units so as to obtain segmentation results of first granularity having a granularity greater than the medium-grained segmentation results. Also, segmentation results of second granularity with more fine-grained than the medium-grained segmentation results are obtained on the basis of the search elements corresponding to each entry stored in the smallest semantic units and the medium-grained segmentation results. It is thus possible to provide segmentation results having at least three granularity levels corresponding to a given text, and it is possible to satisfy the different requirements of various types of applications concerning word segmentation granularity levels. Thus, it is possible to avoid the problems of the prior art, namely the problem of low recall rates (which are the result of lost semantic items) and the problem of low word segmentation precision that the prior art suffers from when it provides multi-granularity segmentation results.

Figure 6:
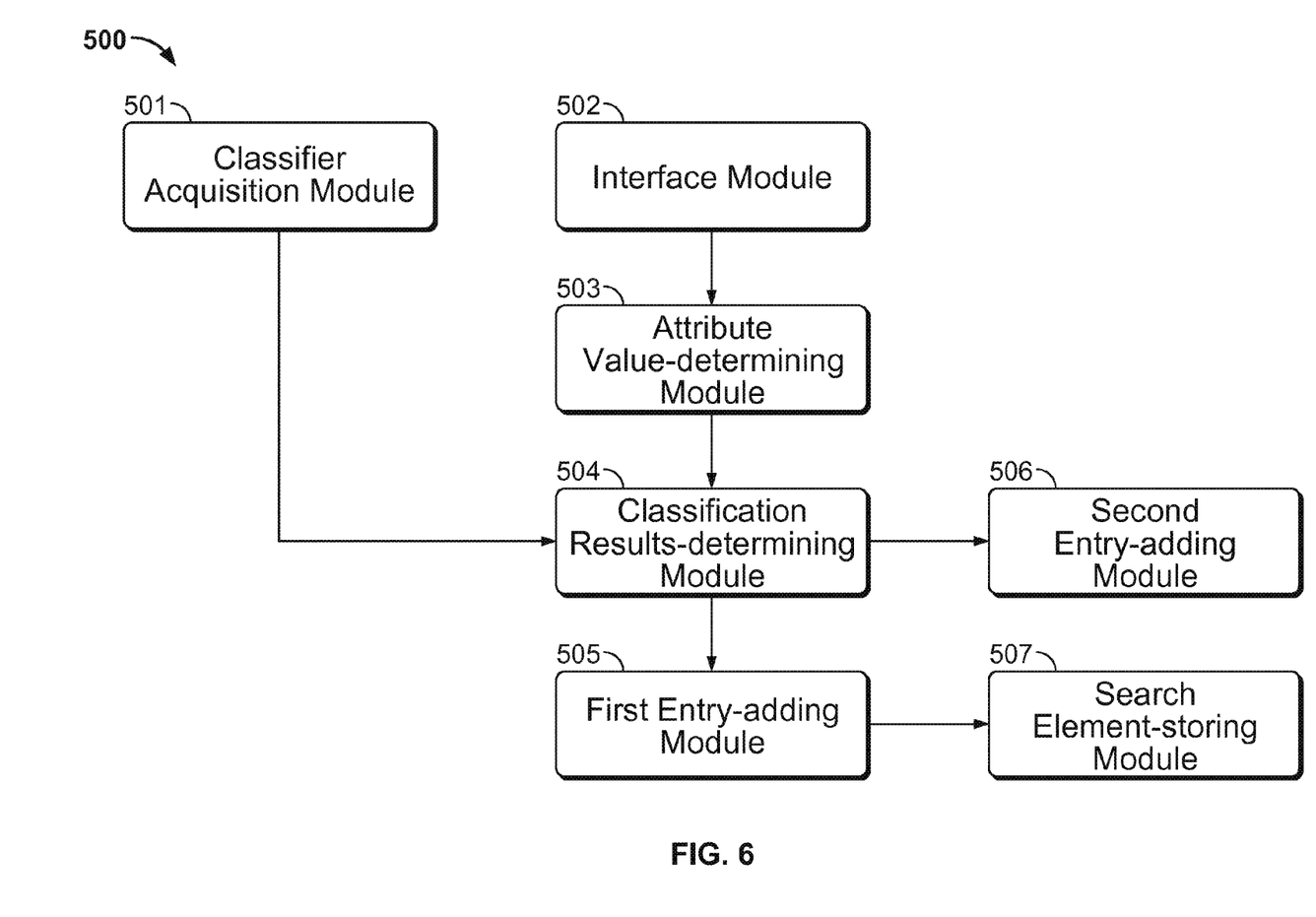
FIG. 6 is a block diagram of an embodiment of a system for establishing a word segmentation lexicon.

FIG. 6 is a block diagram of an embodiment of a system for establishing a word segmentation lexicon. The system is configured to perform process 200. In this example, system 500 comprises a classifier acquisition module 501, an interface module 502, an attribute value-determining module 503, a classification results-determining module 504, and a first entry-adding module 505.

Classifier acquisition module 501 is configured to train a classifier based on a training set, each training sample entry in the training set having a word length attribute, a phrase structure attribute, a semantic attribute, an overlap attribute, and classification results as described above.

Interface module 502 is configured to receive entries to be classified. Examples of the interface module include without limitation external connections, such as a port, cable, wireline or wireless network interface card, etc., and internal connections such as a communication bus.

Attribute value-determining module 503 is configured to determine the attribute values of the word length attribute, phrase structure attribute, semantic attribute, and overlap attribute of the entries to be classified, acquired by the entry to be classified acquisition module 502.

Classification results-determining module 504 is configured to determine, based on the classifier obtained by the classifier acquisition module 501 and on the attribute values of the word length attribute, phrase structure attribute, semantic attribute, and overlap attribute of the entry to be classified as determined by the attribute value-determining module 503, the entry to be classified and determine whether said entry to be classified is a smallest semantic unit.

First entry-adding module 505 is configured to add the entry to be classified to the lexicon of smallest semantic units if the entry to be classified is determined by the classification results-determining module 504 to be a smallest semantic unit.

Preferably, the device in FIG. 5 further comprises a second entry-adding module 506 configured to, upon determination by a second determination module 504 that the entry to be classified is not a smallest semantic unit, add the entry to be classified to a lexicon of compound semantic units.

Preferably, the device further comprises a search element-storing module 507, for storing the segmentation mode of the entry to be classified and the search element corresponding to the entry to be classified in the lexicon of smallest semantic units after the first entry-adding module 505 has added the entry to be classified to the lexicon of smallest semantic units.

Figure 7:
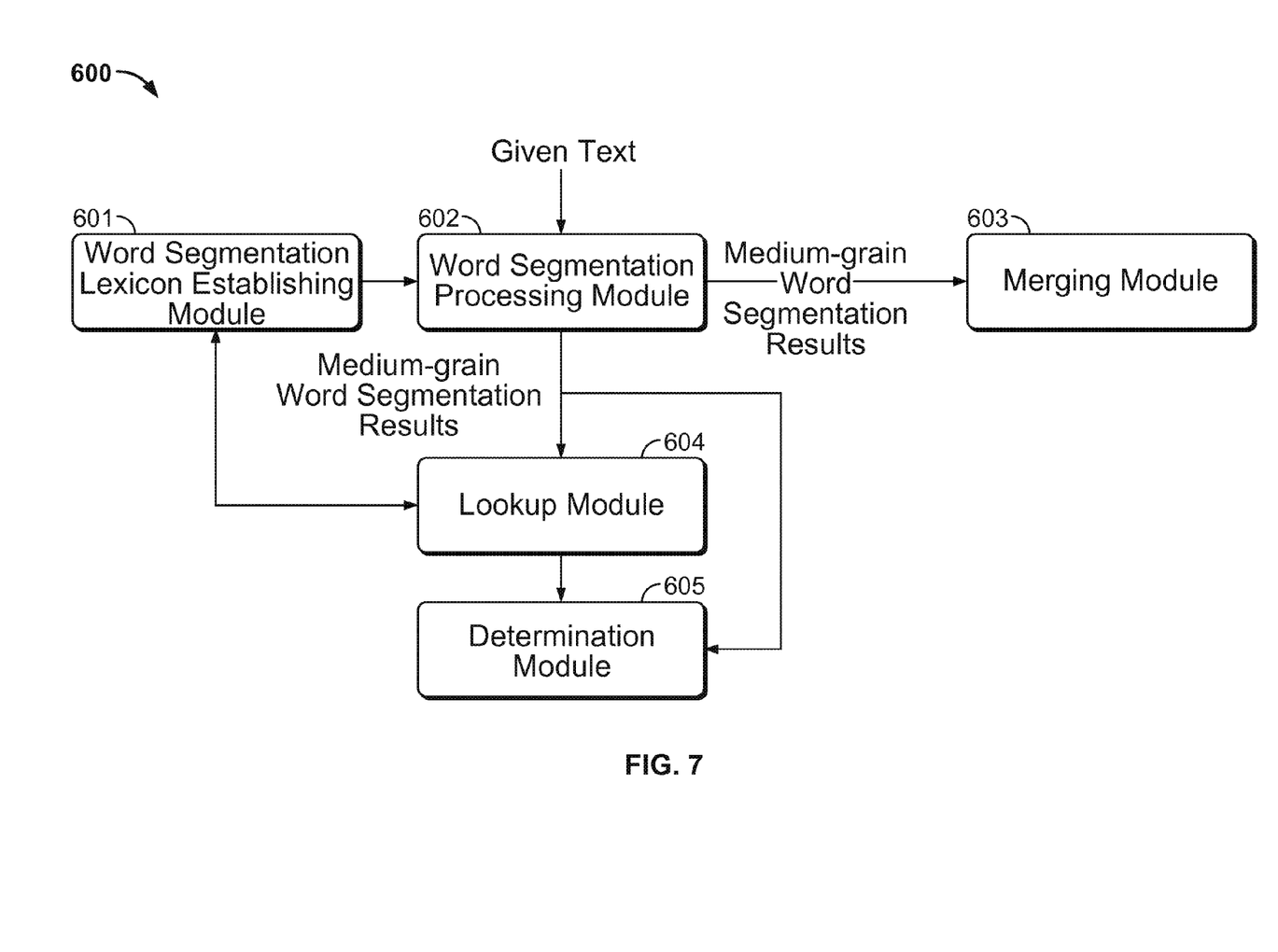
FIG. 7 is a block diagram illustrating an embodiment of a system configured to provide segmentation results of multiple granularities.

FIG. 7 is a block diagram illustrating an embodiment of a system configured to provide segmentation results of multiple granularities. System 600 comprises: a word segmentation lexicon-establishing module 601, a word segmentation processing module 602, a merging module 603, a lookup module 604, and a determination module 605. The system is configured to perform process 300.

Word segmentation lexicon-establishing module 601 is configured to establish a lexicon of smallest semantic units.

Word segmentation processing module 602 is configured to perform word segmentation on a given text in accordance with the lexicon of smallest semantic units established by the lexicon-establishing module 601 and obtain medium-grained segmentation results.

Merging module 603 is configured to merge, based on a lexicon with greater granularity than the lexicon of smallest semantic units and a disambiguation model, the medium-grained segmentation results obtained by the word segmentation processing module 602, obtaining coarser-grained segmentation results.

Lookup module 604 is configured to look up in the lexicon of smallest semantic units search elements (established by the word segmentation lexicon-establishing module 601) corresponding to each segment in sequence in the medium-grained segmentation results obtained by the word segmentation processing module 602.

Determination module 605 is configured to determine finer-grained segmentation results.

Figure 8:
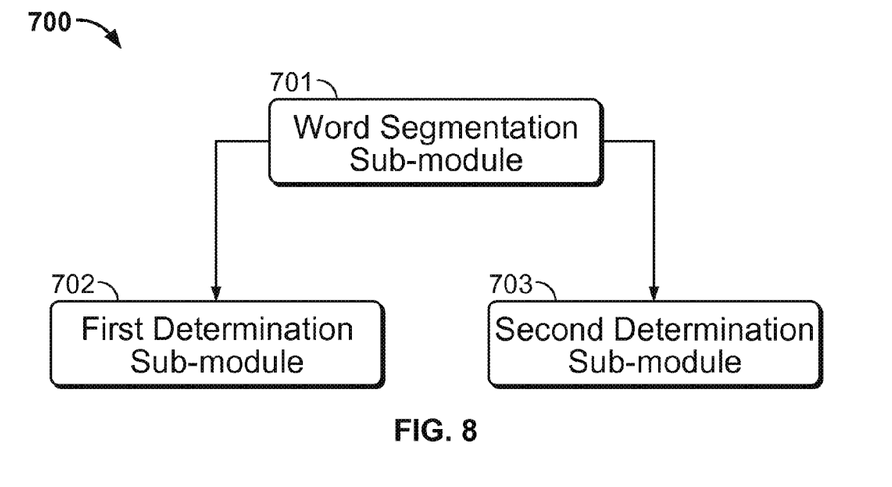
FIG. 8 is a block diagram illustrating an embodiment of a word segmentation processing module.

FIG. 8 is a block diagram illustrating an embodiment of a word segmentation processing module. In this example, word segmentation processing module 700 (e.g., 602 in FIG. 7) comprises a word segmentation sub-module 701, a first determination sub-module 702, and a second determination sub-module 703.

Word segmentation sub-module 701 is configured to perform word segmentation on a given text based on the lexicon of smallest semantic units established by the word segmentation lexicon-establishing module 601.

First determination sub-module 702 is configured to form a segment series as a medium-grained word segmentation result if a unique segment series is obtained through word segmentation by the word segmentation sub-module 701.

A second determination sub-module 703 is configured to select, based on a disambiguation model, one segment series as a medium-grained word segmentation result if the word segmentation sub-module 701 generates multiple segmentation series.

Figure 9:
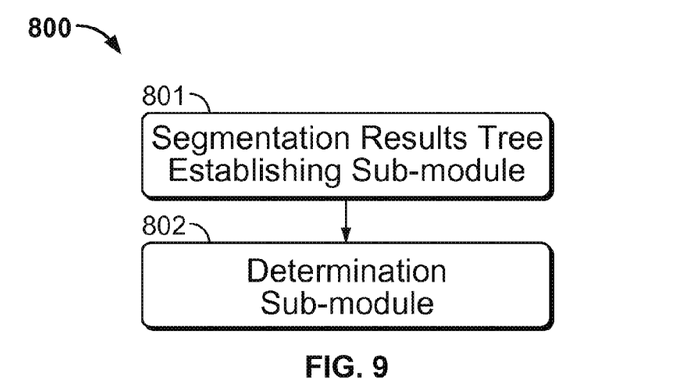
FIG. 9 is a block diagram illustrating an embodiment of a determination module.

FIG. 9 is a block diagram illustrating an embodiment of a determination module. In this example, the determination module 800 (e.g., 605 in FIG. 7) comprises a segmentation results tree-establishing sub-module 801 and a determination sub-module 802.

Segmentation results tree-establishing sub-module 801 is configured to form a segmentation result tree. In some embodiments, it uses a given text to form a root node, using each segment in the medium-grained segmentation results to form a sub-node of the root node, and uses search elements corresponding to the segments as leaf nodes of the nodes corresponding to the segments.

A determination sub-module 802 is configured to obtain in sequence each leaf node in the segmentation results tree established by the segmentation results tree-establishing submodule 801, and regarding the sequentially obtained leaf node as a finer-grained word segmentation result.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

A person having ordinary skill in the art could understand that all or some of the steps involved in realizing the embodiments described above could be completed by having a program instruct the appropriate hardware. This program could be stored on readable storage media, such as: ROM/RAM, magnetic disks, optical disks, etc.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of text processing, comprising:
    training a classifier for classifying text based on a plurality of training sample entries, building a lexicon of smallest semantic units, comprising:
        using the trained classifier to determine whether an entry to be classified is a smallest semantic unit or a compound semantic unit; and
        in the event that the received entry is a smallest semantic unit, adding the received entry to the lexicon of smallest semantic units;
    receiving a text to be translated, the text being in a first language;
    segmenting the received text based on the lexicon of smallest semantic units to obtain medium-grained segmentation results;
    merging the medium-grained segmentation results to obtain coarse-grained segmentation results, the coarse-grained segmentation results having coarser granularity than the medium-grained segmentation results;
    forming a word segmentation tree structure, wherein the received text is used to form a root node of the word segmentation tree structure, and a segment in the medium-grained segmentation results is used to form a sub-node of the root node;
    looking up in the lexicon of smallest semantic units respective search elements that correspond to segments in the medium-grained segmentation results;
    forming a leaf node in the word segmentation tree structure based at least in part on a corresponding search element;
    forming fine-grained segmentation results based on the respective search elements, the fine-grained segmentation results having finer granularity than the medium-grained segmentation results, and obtaining the leaf node as a fine-grained segmentation result; and
    translating, using a processor, the received text into a second language based on the fine-grained segmentation results, the second language being different from the first language.

2. The method of claim 1, wherein the received text is in a non-divider marked language.

3. The method of claim 1, further comprising, in the event that the entry is determined to be a compound semantic unit, adding the entry to a lexicon of compound semantic units.

4. The method of claim 1, wherein using the trained classifier to determine whether the entry is a smallest semantic unit or a compound semantic unit includes inputting into the trained classifier: a character count of the entry, an independent use rate of the entry, a phrase structure rule indicator indicating whether the entry complies with phrase structure rules, a semantic attribute indicating an inclusion state of the entry in the predetermined set of enumerated entries, and an overlap attribute of the entry.

5. The method of claim 1, further comprising:
    determining a search element that corresponds to the entry; and
    saving the search element in the lexicon of smallest semantic units.

6. The method of claim 1, wherein determining a search element that corresponds to the entry includes:
    determining whether the entry is segmentable;
    in the event that the entry is segmentable, setting the search element to a fine-grained word included within the entry; and
    in the event that the entry is not segmentable, setting the search element to the entry.

7. The method of claim 1, wherein segmenting received text based on the lexicon of smallest semantic units to obtain medium-grained segmentation results include resolving an ambiguity of the medium-grained segmentation results.

8. A system for text processing, comprising:
    one or more processors configured to:
        train a classifier for classifying text based on a plurality of training sample entries, build a lexicon of smallest semantic units, comprising:
            using the trained classifier to determine whether an entry to be classified is a smallest semantic unit or a compound semantic unit; and
            in the event that the received entry is a smallest semantic unit, add the received entry to the lexicon of smallest semantic units;
        receive a text to be translated, the text being in a first language;
        segment the received text based on the lexicon of smallest semantic units to obtain medium-grained segmentation results;
        merge the medium-grained segmentation results to obtain coarse-grained segmentation results, the coarse-grained segmentation results having coarser granularity than the medium-grained segmentation results;
        form a word segmentation tree structure, wherein the received text is used to form a root node of the word segmentation tree structure, and a segment in the medium-grained segmentation results is used to form a sub-node of the root node;

look up in the lexicon of smallest semantic units respective search elements that correspond to segments in the medium-grained segmentation results;

form a leaf node in the word segmentation tree structure based at least in part on a corresponding search element;

form fine-grained segmentation results based on the respective search elements, the fine-grained segmentation results having finer granularity than the medium-grained segmentation results, and obtain the leaf node as a fine-grained segmentation result; and translate the received text into a second language based on the fine-grained segmentation results, the second language being different from the first language; and one or more memories coupled to the one or more processors, configured to provide the one or more processors with instructions.

9. The system of claim 8, wherein the text is in a non-divider marked language.

10. The system of claim 8, wherein the one or more processors are further configured to, in the event that the entry is determined to be a compound semantic unit, add the entry to a lexicon of compound semantic units.

11. The system of claim 8, wherein using the trained classifier to determine whether the entry is a smallest semantic unit or a compound semantic unit includes inputting into the trained classifier: a character count of the entry, an independent use rate of the entry, a phrase structure rule indicator indicating whether the entry complies with phrase structure rules, a semantic attribute indicating an inclusion state of the entry in the predetermined set of enumerated entries, and an overlap attribute of the entry.

12. The system of claim 8, wherein the one or more processors are further configured to:

determine a search element that corresponds to the entry; and save the search element in the lexicon of smallest semantic units.

13. The system of claim 8, wherein determining a search element that corresponds to the entry includes:

determining whether the entry is segmentable;

in the event that the entry is segmentable, setting the search element to a fine-grained word included within the entry; and in the event that the entry is not segmentable, setting the search element to the entry.

14. The system of claim 8, wherein segmenting received text based on the lexicon of smallest semantic units to obtain medium-grained segmentation results includes resolving an ambiguity of the medium-grained segmentation results.

15. A computer program product for text processing, the computer program product being embodied in a non-transitory computer readable storage medium and comprising computer instruction to be executed by a computer processor for:

training a classifier for classifying text based on a plurality of training sample entries, building a lexicon of smallest semantic units, comprising:

using the trained classifier to determine whether an entry to be classified is a smallest semantic unit or a compound semantic unit; and in the event that the received entry is a smallest semantic unit, adding the received entry to the lexicon of smallest semantic units;

receiving a text to be translated, the text being in a first language;

segmenting the received text based on the lexicon of smallest semantic units to obtain medium-grained segmentation results;

merging the medium-grained segmentation results to obtain coarse-grained segmentation results, the coarse-grained segmentation results having coarser granularity than the medium-grained segmentation results;

forming a word segmentation tree structure, wherein the received text is used to form a root node of the word segmentation tree structure, and a segment in the medium-grained segmentation results is used to form a sub-node of the root node;

looking up in the lexicon of smallest semantic units respective search elements that correspond to segments in the medium-grained segmentation results;

forming a leaf node in the word segmentation tree structure based at least in part on a corresponding search element;

forming fine-grained segmentation results based on the respective search elements, the fine-grained segmentation results having finer granularity than the medium-grained segmentation results, and obtaining the leaf node as a fine-grained segmentation result; and translating the received text into a second language based on the fine-grained segmentation results, the second language being different from the first language.

* * * * *